United States Patent [19]
Moriyama

[11] Patent Number: 5,233,173
[45] Date of Patent: Aug. 3, 1993

[54] FOCUS DETECTING APPARATUS WITH MULTI-DIRECTIONAL OFF AXIS DETECTION AREAS

[75] Inventor: Keiji Moriyama, Yokohama, Japan
[73] Assignee: Nikon Corporation, Tokyo, Japan
[21] Appl. No.: 765,824
[22] Filed: Sep. 26, 1991
[30] Foreign Application Priority Data Oct. 1, 1990 [JP] Japan .................................. 2-260448
Oct. 1, 1990 [JP] Japan .................................. 2-260449

[51] Int. Cl.⁵ ............................................. G03B 13/36
[52] U.S. Cl. .................................... 250/201.8; 354/406
[58] Field of Search ...................................... 250/201.8; 354/406–408

[56] References Cited

U.S. PATENT DOCUMENTS

| | | | |
|---|---|---|---|
| 4,949,116 | 8/1990 | Karasaki et al. | 354/408 |
| 4,967,226 | 10/1990 | Kuwata | 354/406 |
| 4,978,988 | 12/1990 | Karasaki et al. | 356/406 |
| 4,982,219 | 1/1991 | Uchiyama | 354/406 |

FOREIGN PATENT DOCUMENTS 62-95511 5/1987 Japan.
63-11906 1/1988 Japan.

*Primary Examiner*—David C. Nelms
*Assistant Examiner*—Stephone Allen
*Attorney, Agent, or Firm*—Shapiro and Shapiro

[57] ABSTRACT

In a focus detecting apparatus provided with a focus detecting optical system comprising a field mask provided at the predetermined image plane position of a photo-taking lens and having an opening corresponding to a focus detection area, a condenser lens provided rearwardly of the field mask and positioned near the predetermined image plane of the photo-taking lens, a pair of stop masks provided rearwardly of the condenser lens and dividing the pupil of the photo-taking lens into two areas by a pair of openings therein, and a re-imaging lens system having a pair of re-imaging lenses corresponding to the openings in the stop mask, the image by the photo-taking lens being re-formed as secondary images on a pair of photoelectric conversion element arrays by the focus detecting optical system, the focus adjusted state of the photo-taking lens being detected from the relative positional relation between the secondary images, a plurality of focus detecting optical systems are disposed so that they have at least two focus detection areas about a position off the optical axis of the photo-taking lens and the directions of detection of these focus detection areas differ from each other, and the center positions of the pairs of openings in the stop masks of the focus detecting optical systems are set to different positions.

9 Claims, 5 Drawing Sheets

FOCUS DETECTING APPARATUS WITH MULTI-DIRECTIONAL OFF AXIS DETECTION AREAS

BACKGROUND OF THE INVENTION

1. Field of the Invention

This invention relates to a focus detecting apparatus in a camera or the like using, for example, a TTL phase difference detecting system, and particularly to a focus detecting apparatus for detecting the in-focus state in a plurality of areas in the image plane of a photo-taking lens.

2. Related Background Art

Generally, a focus detecting apparatus as shown in FIG. 1 of the accompanying drawings is known as a focus detecting apparatus used, for example, in a camera or the like. In FIG. 1, the reference numeral 1 designates a photo-taking lens, the reference numeral 2 denotes a field mask, the reference numeral 3 designates a condenser lens, the reference numeral 4 denotes a stop mask, the reference numeral 5 designates a re-imaging lens, and the reference numeral 6 denotes a photoelectric conversion element array. The reference numerals 7 and 8 designate the exit pupil and the optical axis, respectively, of the photo-taking lens 1.

In the thus constructed focus detecting apparatus, a standard portion light beam and a reference portion light beam transmitted through the photo-taking lens 1 are photoelectrically converted by the photoelectric conversion element array 6 and the focus is detected.

A focus detecting apparatus of this kind is disclosed in Japanese Laid-Open Patent Application No. 63-11906.

This apparatus comprises a first photoelectric conversion element array and a second photoelectric conversion element array disposed at a position containing the optical axis of a photo-taking lens and a position not containing the optical axis, respectively, the direction of said second photoelectric conversion element array being set to a direction substantially perpendicular to a straight line passing through the second photoelectric conversion element array and the optic axis.

However, in the focus detecting apparatus of this kind, of focus detection areas which do not contain the optical axis of the photo-taking lens, any focus detection area does not intersect another focus detection area which does not contain the optic axis, in the direction of detection, and focus detection has been impossible for any object which does not have a luminance distribution in a direction of detection fit for a focus detecting optical system.

There is also a focus detecting apparatus according to the prior art which, as disclosed in Japanese Laid-Open Patent Application No. 62-95511, makes focus detection possible even for any object which does not have a luminance distribution in a direction fit for a focus detecting optical system.

This apparatus comprises a secondary imaging system and a plurality of pairs of photoelectric conversion means so that the image on the predetermined focal plane of a photo-taking lens may be separated into two secondary images and re-imaged by a secondary imaging system and the directions of change in the relative spacing between these two images may differ from each other.

In the focus detecting apparatus according to the prior art, however, when the direction of detection of a focus detection area is perpendicular to a straight line passing through this focus detection area and the optical axis, a pair of light beams forming the secondary images have been eclipsed in a direction nearly perpendicular to the change in the relative position and on the other hand, when the optic axis lies on the extension of the direction of detection of the focus detection area, the pair of light beams forming the secondary images have been eclipsed in the direction of change of the relative position. As a result, only the optical system in a particular direction is greatly affected by the eclipse and focus detection becomes impossible, and this has led to the problem that the reliability of focus detection is reduced.

SUMMARY OF THE INVENTION

The present invention has been made in view of such circumstances and provides a focus detecting apparatus in which the occurrence of the impossibility of focus detection can be prevented over a wide range, thereby improving the reliability of focus detection.

In the focus detecting apparatus according to the present invention, a plurality of focus detecting optical systems are disposed so that they have at least two focus detection areas about a position off the optical axis of a photo-taking lens and the directions of detection of these focus detection areas differ from each other, and each pair of openings in a stop mask of said focus detecting optical systems have their center positions set to different positions.

In another embodiment of the focus detecting apparatus according to the present invention, said optical systems have at least two focus detection areas capable of detecting the focus at the same point on a predetermined image plane of the photo-taking lens, and the center positions of these focus detection areas differ from each other.

In the present invention, the influence of eclipse in a particular direction upon the centers of gravity of a pair of light beams forming secondary images can be alleviated.

DESCRIPTION OF THE PREFERRED EMBODIMENTS

Figure 1:
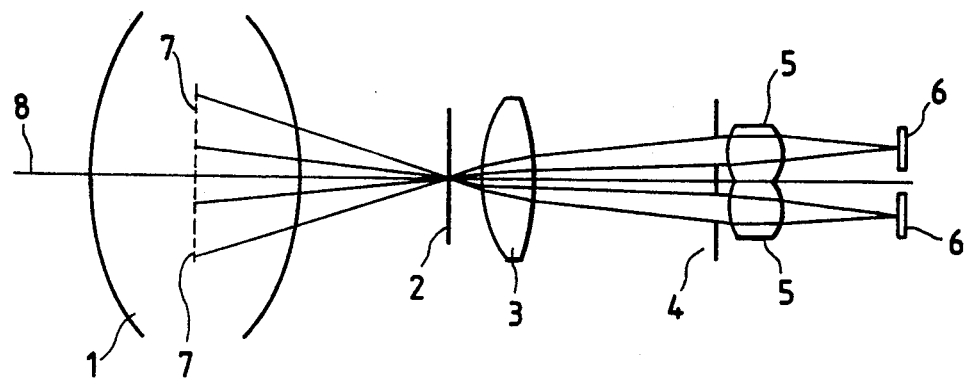
FIG. 1 is a view for illustrating the principle of a focus detecting optical system.

The construction of the present invention will hereinafter be described in detail with respect to some embodiments of the invention shown in the drawings.

Figure 2:
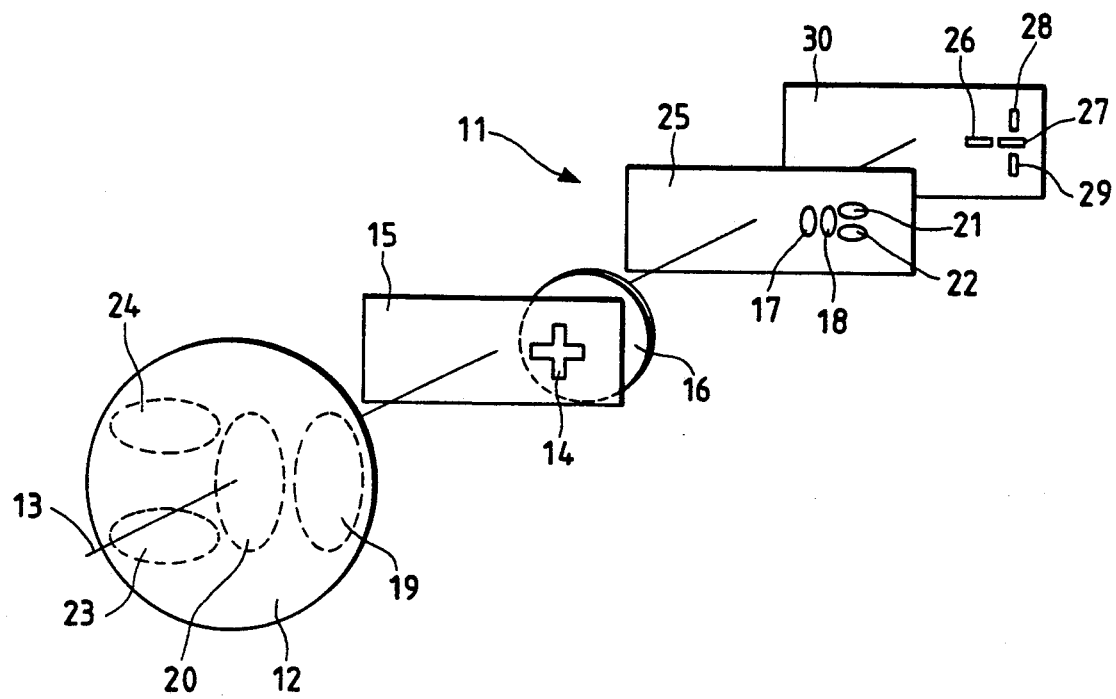
FIG. 2 is a perspective view showing an embodiment of the focus detecting apparatus according to the present invention.
Figure 3:
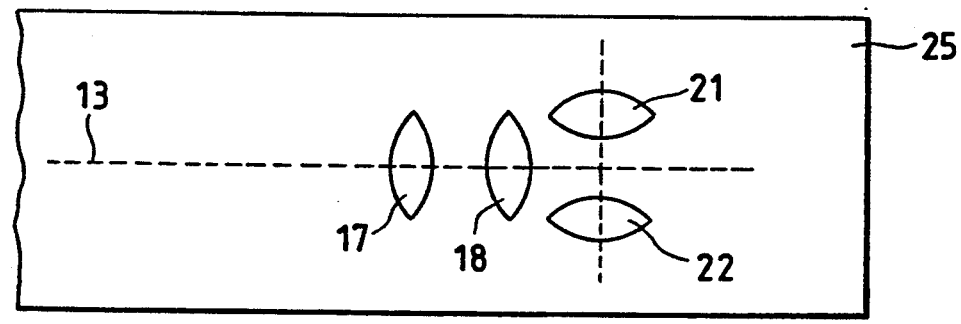
FIG. 3 is a front view showing the stop mask of the focus detecting apparatus according to the present invention.

FIG. 2 is a perspective view showing an embodiment of the focus detecting apparatus according to the present invention, and FIG. 3 is a front view showing the stop mask of the focus detecting apparatus according to the present invention. In FIG. 2, the reference numeral 11 designates an optical system for focus detection provided rearwardly of a photo-taking lens 12. This optical system 11 is comprised of two optical systems having focus detection areas about a position off the optical axis 13 of the photo-taking lens 12 and in which the directions of detection of these focus detection areas are perpendicular to each other. That is, the optical system 11 comprises a field mask 15 disposed at the predetermined image plane position of the photo-taking lens 12 and having a cruciform opening 14 corresponding to the focus detection areas at a location which does not contain the optical axis 13, a condenser lens 16 disposed rearwardly of the field mask 15 and positioned near the predetermined image plane of the photo-taking lens 12, a stop mask 25 disposed rearwardly of the condenser lens 16 and dividing the exit pupil into two areas 19 and 20 by a pair of openings 17 and 18 juxtaposed laterally and dividing the exit pupil into two areas 23 and 24 by a pair of openings 21 and 22 having their centers at locations differing from the locations of the centers of the openings 17 and 18 and juxtaposed longitudinally, and a re-imaging lens system (not shown) having two pairs of re-imaging lenses (not shown) corresponding to the openings 17, 18, 21 and 22 in the stop mask 25, and is designed such that the image by the photo-taking lens 12 is re-formed as secondary images on two pairs of photoelectric conversion element arrays 26–29 and the focus of the photo-taking lens 12 is detected from the relative positional relation between these secondary images. Among the components of this optical system 11, the openings 17 and 18 in the stop mask 25 form a first focus detection area and are positioned near the optic axis 13 as compared with the openings 21 and 22 which form a second focus detection area. The optical axis 13 of the photo-taking lens 12 is contained on a line extending in the direction of detection of the first one of the two focus detection areas of the stop mask 25. The reference numeral 30 denotes a substrate on which the photoelectric conversion element arrays 26–29 are disposed.

Figure 4:
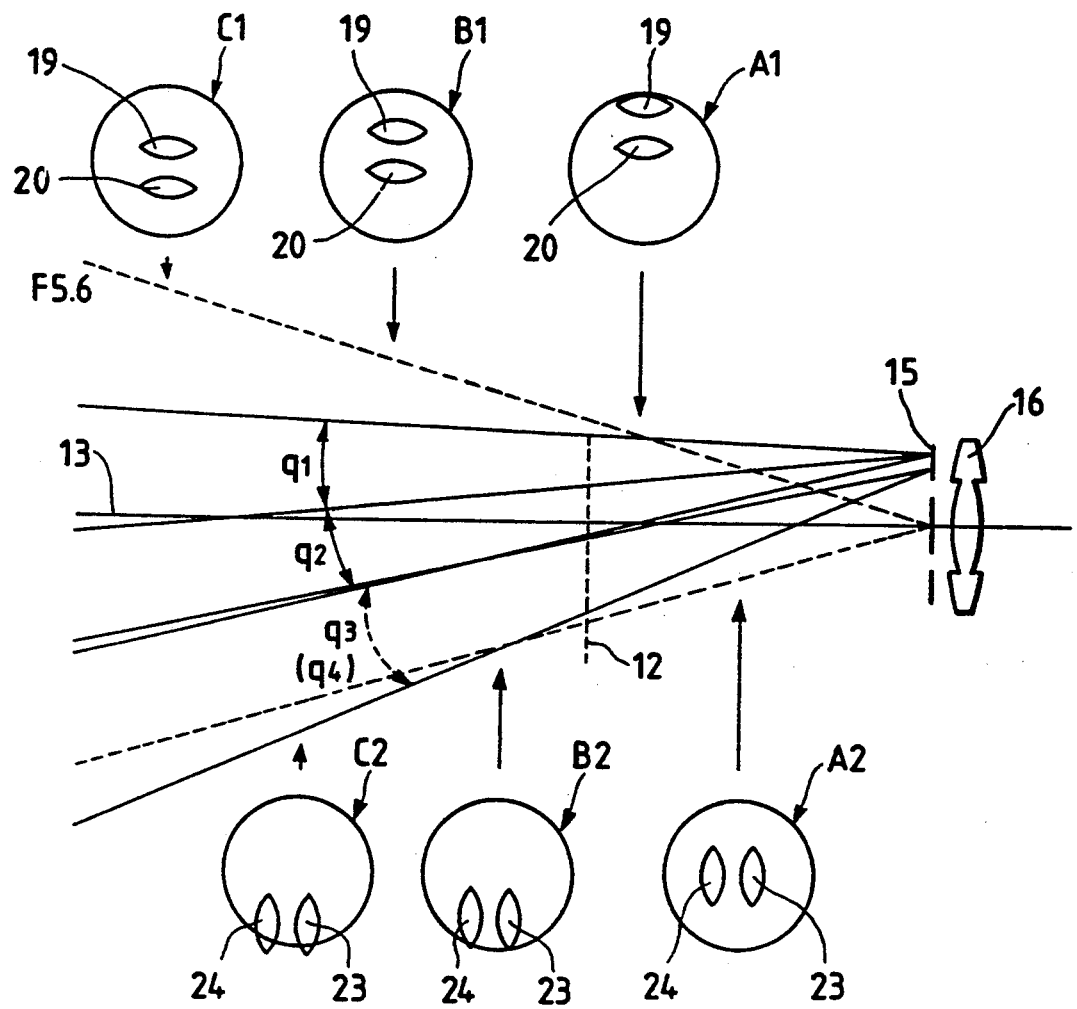
FIG. 4 is a view for illustrating the focus detection in an embodiment of the present invention.

Focus detection in the thus constructed focus detecting apparatus will now be described with reference to FIG. 4.

At the detection area ends corresponding to the openings 17 and 18 in the stop mask 25, the light beam which divides the exit pupil of the photo-taking lens 12 into the two areas 19 and 20 is within ranges $q_1$ and $q_2$ and therefore, if the exit pupil is at a position indicated by arrow, for example, relative to an aperture of F5.6, the state in which the exit pupil is divided into the two areas 19 and 20 will be as indicated by $A_1$–$C_1$. Thus, even if the pupil position becomes far, no eclipse will occur at the focus detection area ends corresponding to the openings 19 and 20.

On the other hand, at the detection area ends corresponding to the openings 21 and 22 in the stop mask 25, the light beam which divides the exit pupil of the photo-taking lens 12 is within ranges $q_3$ and $q_4$ and therefore, if the exit pupil is at a position indicated by arrow, for example, relative to an aperture of F5.6, the state in which the exit pupil is divided into the two areas 23 and 24 will be as indicated by $A_2$–$C_2$. Thus, if the exit position becomes far, eclipse will occur in the two areas 23 and 24 into which the exit pupil is divided, but the influence of the eclipse upon focus detection is very small because the location of this eclipse is substantially perpendicular to the direction of detection of the focus detection area and eclipse is present substantially similarly in the two areas 23 and 24.

Accordingly, in the present embodiment, the influence of the eclipse in a particular direction upon the centers of gravity of the pair of light beams forming secondary images can be alleviated and therefore, the occurrence of the impossibility of focus detection can be prevented over a wide range.

As described above, according to the present invention, a plurality of focus detecting optical systems are disposed so that they have focus detection areas about a position off the optical axis of the photo-taking lens and the directions of detection of these focus detection areas differ from each other, and the openings in the stop mask of these optical systems have their center positions set to different positions and therefore, the influence of the eclipse in a particular direction upon the centers of gravity of the pair of light beams forming secondary images can be alleviated. Accordingly, the occurrence of the impossibility of focus detection can be prevented over a wide range and therefore, the reliability of focus detection can be improved.

Figure 5:
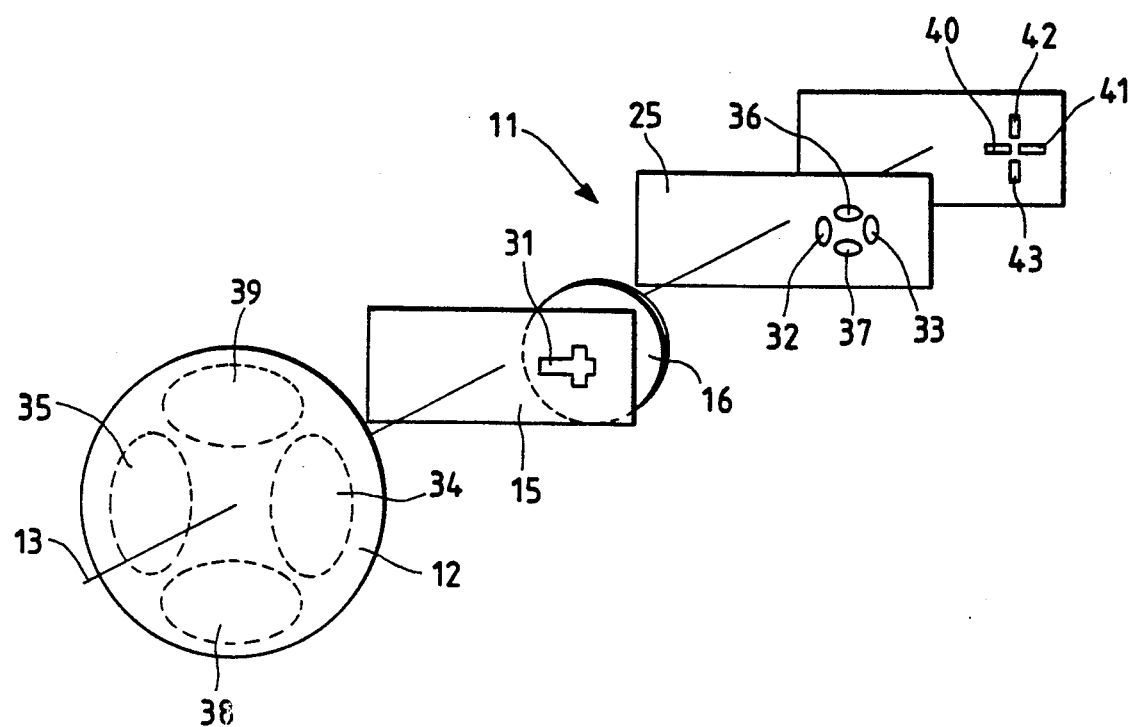
FIG. 5 is a perspective view showing another embodiment of the focus detecting apparatus according to the present invention.
Figure 6:
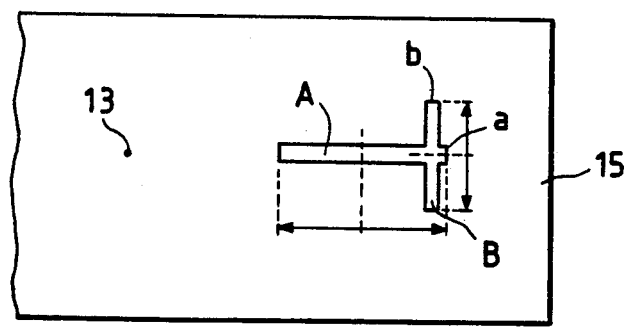
FIG. 6 shows the field mask of the focus detecting apparatus according to the present invention.

FIG. 5 is a perspective view showing another embodiment of the focus detecting apparatus according to the present invention, and FIG. 6 is a front view showing the field mask of the focus detecting apparatus according to the present invention. In these figures, the same portions as those of the embodiment of the focus detecting apparatus shown in FIG. 2 are given the same reference numerals and need not be described.

The optical system 11 comprises a field mask 15 disposed at the predetermined image plane position of the photo-taking lens 12 and having a cruciform opening 31 corresponding to the focus detection area, a condenser lens 16 disposed rearwardly of the field mask 15 and positioned near the predetermined image plane of the photo-taking lens 12, a stop mask 25 provided rearwardly of the condenser lens 16 and dividing the exit pupil into two areas 34 and 35 by a pair of openings 32 and 33 juxtaposed laterally and dividing the exit pupil into two areas 38 and 39 by a pair of openings 36 and 37 having their centers at the same positions as the center positions of the openings 32 and 33 and juxtaposed longitudinally, and a re-imaging lens system (not shown) having two pairs of re-imaging lenses (not shown) corresponding to the openings 32, 33, 36 and 37 in the stop mask 25, and is designed such that the image by the photo-taking lens 12 is re-formed as secondary images on two pairs of photo-electric conversion element arrays 40–43 and the focus of the photo-taking lens 12 is detected from the relative positional relation between these secondary images. Among the components of this optical system 11, the opening 31 in the field mask 15 is formed by an opening having two focus detection areas A and B capable of detecting the focus at the same point on the predetermined image plane of the photo-taking lens 12 and differing in the center positions of the focus detection areas A and B. The distance between the focus detection area end a of the focus detection area ends of the focus detection area A which is farthest from the optical axis 13 and the optical axis 13 and the distance between the focus detection area end b of the focus detection area ends of the focus detection area B which is farthest from the optical axis 13 and the optical axis 13 are set to substantially the same dimension. Also, the optical axis 13 of the photo-taking lens 12 is contained on a line extending in the direction of detection of the focus detection area A of the two focus detection areas A and B which is the direction opposite to the side of the focus detection area B.

Figure 7:
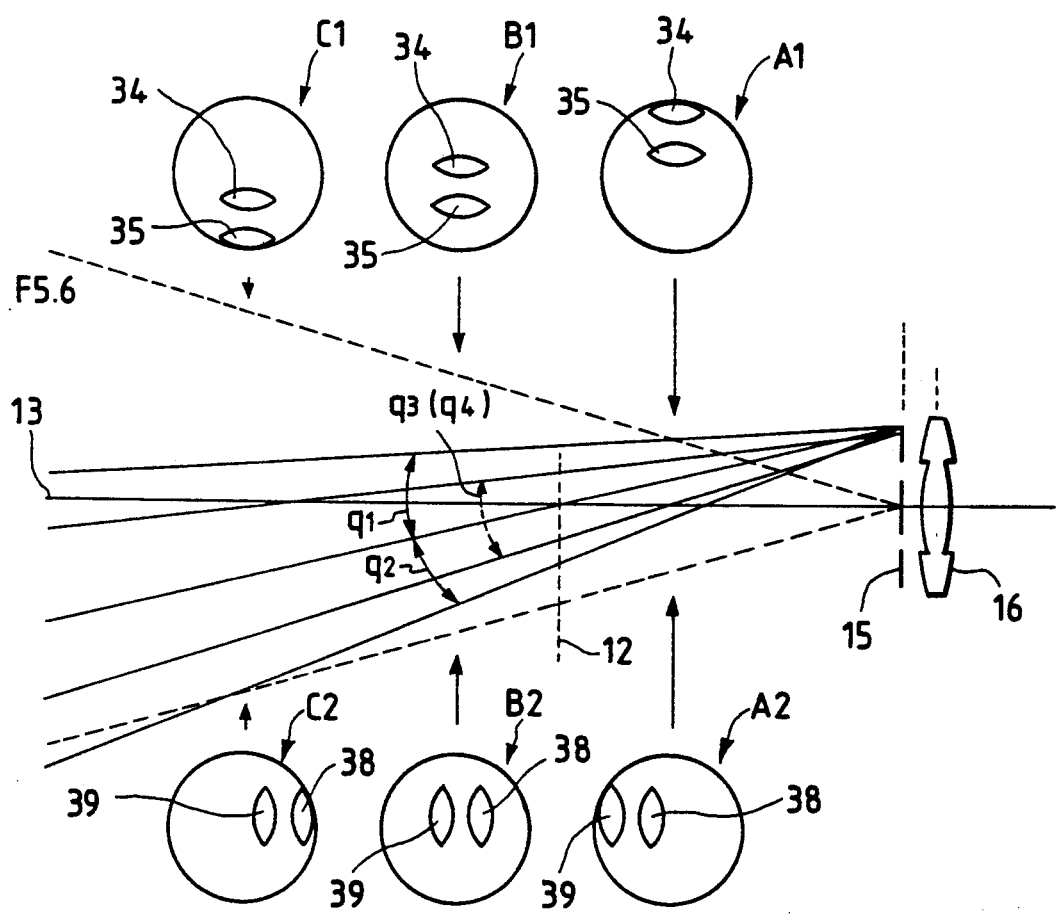
FIG. 7 is a view for illustrating the focus detection in another embodiment of the present invention.

Focus detection in the thus constructed focus detecting apparatus will now be described with reference to FIG. 7.

At the focus detection area end a of the focus detection area ends of the opening 31 in the field mask 15 which is farthest from the optical axis 13 of the photo-taking lens 12, the light beam which divides the exit pupil into the two areas 34 and 35 is within ranges $q_1$ and $q_2$ and therefore, if the exit pupil is at a position indicated by arrow, for example, relative to an aperture of F5.6, the state in which the exit pupil is divided into the two areas 34 and 35 will be as indicated by $A_1-C_1$.

On the other hand, at the focus detection area end b of the focus detection area ends of the opening 31 in the field mask 15 which is farthest from the optical axis 13 of the photo-taking lens 12, the light beam which divides the exit pupil into the two areas 38 and 39 is within ranges $q_3$ and $q_4$ and therefore, if the exit pupil is at a position indicated by arrow, for example, relative to an aperture of F5.6, the state in which the exit pupil is divided into the two areas 38 and 39 will be as indicated by $A_2-C_2$.

Accordingly, in the present embodiment, the influence of eclipse in a particular direction upon the centers of gravity of the pair of light beams forming secondary images can be alleviated and therefore, the occurrence of the impossibility of focus detection can be prevented over a wide range.

Also, in the present embodiment, the distance between the focus detection area end a of the focus detection area ends of the focus detection area A which is farthest from the optical axis 13 and the optical axis 13 and the distance between the focus detection area end b of the focus detection area ends of the focus detection area B which is farthest from the optical axis 13 and the optical axis 13 are set to substantially the same dimension and thus, the exit pupil positions at which eclipse occurs in the directions of detection of the focus detection areas A and B become substantially equal and the influences of the eclipse of the two focus detection areas in which the directions of detection are vertically and horizontally orthogonal to each other upon focus detection become substantially equal.

Figure 8:
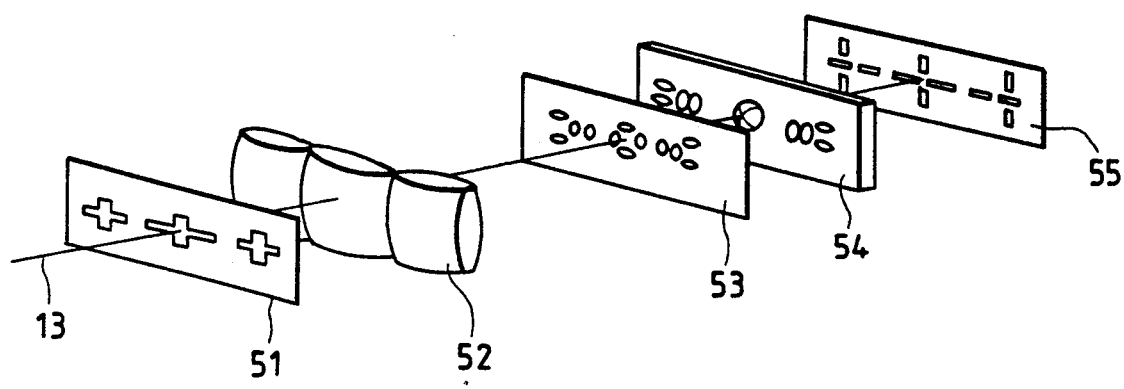
FIG. 8 is a perspective view showing another embodiment of the present invention.
Figure 9:
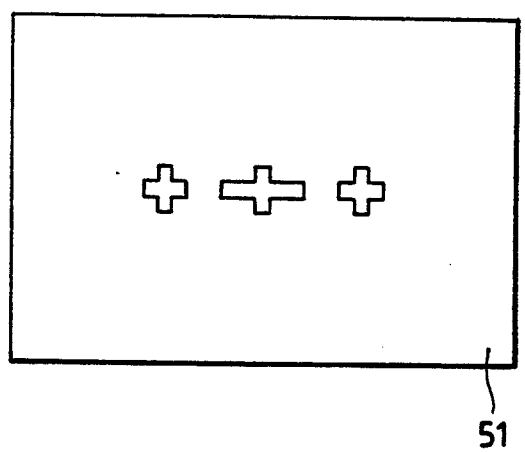
FIG. 9 is a front view showing the field mask in the embodiment of FIG. 8.

Further, the present embodiment has been shown with respect to a case where the apparatus has an optical system which does not contain the optical axis 13 in the focus detection areas, whereas the present invention is not restricted thereto, but is also applicable to an apparatus comprising, as shown for example in FIGS. 8 and 9 (a field mask), a combination of two optical systems which do not contain the optical axis 13 in the focus detection areas and an optical system which contains the optical axis 13 in the focus detection areas. In FIGS. 8 and 9, the reference numeral 51 designates a field mask, the reference numeral 52 denotes a condenser lens, the reference numeral 53 designates a stop mask, the reference numeral 54 denotes a re-imaging lens system, and the reference numeral 55 designates a photoelectric conversion element array plate.

Also, the present embodiment has been shown with respect to a case where the directions of detection of the focus detection areas of the optical system are perpendicular to each other, but in the present invention, the directions of detection of the focus detection areas have only to differ from each other.

Further, of course, the number of optical systems in the present invention is not limited to that in the afore-described embodiments.

As described above, according to the present invention, a plurality of focus detecting optical systems are disposed so that they have focus detection areas about a position off the optical axis of a photo-taking lens and the directions of detection of these focus detection areas differ from each other, and these optical systems have a plurality of focus detection areas capable of detecting the focus at the same point on the predetermined image plane of the photo-taking lens and the center positions of these focus detection areas differ from each other and therefore, the influence of eclipse in a particular direction upon the centers of gravity of a pair of light beams forming secondary images can be alleviated. Accordingly, the occurrence of the impossibility of focus detection can be prevented over a wide range and therefore, the reliability of focus detection can be improved.

I claim:

1. In a focus detecting apparatus provided with a focus detecting optical system comprising:
    a field mask provided at a predetermined image plane position of a photo-taking lens and having an opening corresponding to a focus detection area;
    a condenser lens provided rearwardly of said field mask and positioned near the predetermined image plane of said photo-taking lens;
    a stop mask provided rearwardly of said condenser lens and dividing the pupil of said photo-taking lens into two areas by a pair of openings therein; and
    a re-imaging lens system having a pair of re-imaging lenses corresponding to the openings in said stop mask;
    an image formed by said photo-taking lens being re-formed as secondary images on a pair of photoelectric conversion element arrays by said focus detecting optical system;
    the focus adjusted state of said photo-taking lens being detected from the relative positional relation between said secondary images;
    the improvement comprising a plurality of said focus detecting optical systems disposed so that they have at least two focus detection areas about a position off an optical axis of said photo-taking lens and the directions of detection of said focus detection areas differ from each other, each focus detection area comprising a pair of stop mask openings;
    the center positions of the pairs of openings of said focus detecting optical systems being set to different positions.

2. A focus detecting apparatus according to claim 1, wherein two of said focus detecting optical systems are formed, said focus detecting optical systems detect the focus of the same point off the optical axis on said predetermined image plane position of said photo-taking lens, and the directions of detection of the focus detection areas of said focus detecting optical systems are set to directions orthogonal to each other.

3. A focus detecting apparatus according to claim 2, wherein the optical axis of the photo-taking lens is contained on a line extending in the direction of detection of one of the focus detection areas of said two focus detecting optical systems.

4. In a focus detecting apparatus provided with a focus detecting optical system comprising:
- a field mask provided at a predetermined image plane position of a photo-taking lens and having an opening corresponding to a focus detection area;
- a condenser lens provided rearwardly of said field mask and positioned near the predetermined image plane of said photo-taking lens;
- a stop mask provided rearwardly of said condenser lens and dividing the pupil of said photo-taking lens into two areas by a pair of openings therein; and
- a re-imaging lens system having a pair of re-imaging lenses corresponding to the openings in said stop mask;
- an image formed by said photo-taking lens being re-formed as secondary images on a pair of photoelectric conversion element arrays by said focus detecting optical system;
- the focus adjusted state of said photo-taking lens being detected from the relative positional relation between said secondary images;
- the improvement comprising a plurality of said focus detecting optical systems disposed so that they have at least two focus detection areas about a position off an optical axis of said photo-taking lens and the directions of detection of said focus detection areas differ from each other;
- the center positions of said focus detection areas on said predetermined image plane position of said photo-taking lens differing from each other.

5. A focus detecting apparatus according to claim 4, wherein the distances between the ends of said focus detection areas which are farthest from the optical axis of said photo-taking lens and the optical axis of said photo-taking lens are set to substantially the same dimension.

6. A focus detecting apparatus according to claim 4, wherein two of said focus detecting optical systems are formed, said focus detecting optical systems detect the focus of the same point off the optical axis on the predetermined image plane position of said photo-taking lens, and the directions of detection of the focus detection areas of said focus detecting optical systems are set to directions orthogonal to each other.

7. A focus detecting apparatus according to claim 6, wherein the optical axis of said photo-taking lens is contained on a line extending in the direction of detection of one of the focus detection areas of said two focus detecting optical systems.

8. A focus detecting apparatus according to claim 1, wherein the openings of one pair are spaced in one direction of detection, and the openings of another pair are spaced in a different direction of detection, both of the last-mentioned pairs being disposed at a same side of said optical axis, the openings of said one pair being closer to the optical axis than the openings of said another pair.

9. A focus detecting apparatus according to claim 4, wherein said two focus detection areas comprise two openings, respectively, in a mask provided forwardly of said condenser lens, said openings being disposed at a same side of sad optical axis and extending in different directions.

* * * * *